United States Patent [19]

DeMartino

[11] 4,143,007

[45] Mar. 6, 1979

[54] THICKENING AGENT CONTAINING A POLYGALACTOMANNAN GUM AND A COPOLYMER OF AN OLEFINICALLY UNSATURATED DICARBOXYLIC ACID ANHYDRIDE USEFUL IN HYDRAULIC WELL-TREATING

[75] Inventor: Ronald N. DeMartino, Wayne, N.J.

[73] Assignee: Celanese Corporation, New York, N.Y.

[21] Appl. No.: 847,339

[22] Filed: Oct. 31, 1977

[51] Int. Cl.$^2$ .............................................. C08L 5/00
[52] U.S. Cl. ........................... 260/17.4 ST; 252/8.55 R
[58] Field of Search ................................ 260/17.4 ST; 252/8.55 R

[56] References Cited

U.S. PATENT DOCUMENTS

| | | | |
|---|---|---|---|
| 3,393,168 | 7/1968 | Johnson | 252/8.55 R |
| 3,615,794 | 10/1971 | Nimerick | 252/8.55 R |
| 3,743,613 | 7/1973 | Coulter et al. | 260/17.4 ST |
| 3,974,077 | 8/1976 | Free | 252/8.55 R |
| 4,038,206 | 7/1977 | Karl | 252/8.55 R |
| 4,057,509 | 11/1977 | Costanza et al. | 252/8.55 R |

Primary Examiner—M. J. Welsh
Attorney, Agent, or Firm—Kenneth A. Genoni

[57] ABSTRACT

This invention provides a novel dry blend composition adapted for application as a thickening agent in aqueous solutions. The composition consists essentially of an admixture of a polygalactomannan gum and a copolymer containing carboxylate groups.

The invention composition contributes exceptionally high viscosity to an aqueous solution due to a synergistic viscosity effect derived from the interaction of the polygalactomannan and copolymer components.

32 Claims, No Drawings

THICKENING AGENT CONTAINING A POLYGALACTOMANNAN GUM AND A COPOLYMER OF AN OLEFINICALLY UNSATURATED DICARBOXYLIC ACID ANHYDRIDE USEFUL IN HYDRAULIC WELL-TREATING

BACKGROUND OF THE INVENTION

Hydrophilic vegetable gums have been known and utilized for a variety of industrial applications for many years. They are readily utilized in aqueous solutions in many manufacturing processes such as textile, cosmetic, foodstuff, and the drilling and secondary production of subterranean wells. Of particular importance is their ability to form viscous colloidal dispersions in aqueous environments.

Even in small quantities, the addition of the gum causes an increase in viscosity and in some instances a gel structure develops. This gel formation is especially desirable when minute undissolved solids are present in an environment, and must be maintained in a relatively uniform state of dispersion after agitation has been reduced or terminated. Such conditions are typical in the drilling of subterranean wells for oil, gas, water, and the like. One of the most versatile hydrophilic vegetable gums is galactomannan gum, which has a high tolerance for the presence of electrolytes.

To enhance thixotropic characteristics and enable greater viscosities to be developed from a given amount of the galactomannan material in solution, a crosslinking effect may be utilized. Linear polymer chains can be joined together by materials having two or more functional groups. The crosslinking may involve covalent, ionic-coordination or hydrogen bonds. Weaker bonding, such as achieved through hydrogen bonding, induces a labile structure that is easily disrupted by mechanical force.

The polygalactomannan gums are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-$\beta$-glycosidic linkage and the galactose branching takes place by means of a 1-6 linkage on alternate mannose units. The ratio of galactose to mannose in the guar polymer is, therefore, one to two. Guar gum has a molecular weight of about 220,000.

Locust bean gum is also a polygalactomannan gum of similar molecular structure in which the ratio of galactose to mannose is one to four. Guar and locust bean gum are the preferred sources of the polygalactomannans, principally because of the commercial availability thereof.

Polygalactomannan gums swell readily in cold water and can be dissolved in hot water to yield solutions which characteristically have a high viscosity even at a concentration of 1-1.5 percent. Guar gum and locust bean gum as supplied commercially usually have a viscosity (at 1% concentration) of around 1000 to 4000 centipoises at 25° C. using a Brookfield Viscometer Model LVF, spindle No. 2 at 6 rpm.

There are various rigorous applications that require greater stability under variable conditions than is provided by hydrocolloid gums that are commercially available. For example, it is desirable that a gum which functions as a protective colloid or gelling agent in oil well drilling mud compositions and oil well fracturing compositions exhibit a degree of solution stability and heat stability under operating conditions.

Further, solutions of ordinary hydrocolloid gums are not sufficiently stable under variable conditions of pH and temperature, or not sufficiently stable in the presence of polyvalent metal ions, to qualify for general application in the textile industry for sizing, printing and finishing operations, or in the paper industry as sizing and coatings agents.

Accordingly, it is a main object of the present invention to provide hydrocolloid gum compositions having improved viscosity properties for applications in petroleum, textile, printing, paper and pharmaceutical industries.

It is another object of the present invention to provide dry blends of polygalactomannan gum-containing thickening compositions and high viscosity aqueous solutions produced therewith.

It is a further object of the present invention to provide thickening agents which have superior solution stability and heat stability, and which contribute exceptionally high viscosity to aqueous solutions due to a synergistic viscosity effect derived from the interaction of thickening agent components.

Other objects and advantages shall become apparent from the following description and examples.

DESCRIPTION OF THE INVENTION

One or more objects of the present invention are accomplished by the provision of a dry blend composition adapted for application as a thickening agent in aqueous solutions which comprises (1) a polygalactomannan gum and (2) a copolymer of an $\alpha,\beta$-olefinically unsaturated dicarboxylic acid anhydride and a comonomer selected from $\alpha$-olefinically unsaturated hydrocarbons and alkyl vinyl ethers.

The present invention further provides an aqueous composition having a pH in the range between about 4 and 13, which has superior high viscosity properties derived from the presence of the above-described novel thickening agent.

Whenever the following description refers specifically to guar gum, it is understood that the disclosure is applicable to the other closely related polygalactomannan gums in general, and locust bean gum in particular.

By the term "degree of substitution" as employed herein is meant the average substitution of ether groups per anhydro sugar unit in the polygalactomannan gums. In guar gum, the basic unit of the polymer consists of two mannose units with a glycosidic linkage and a galactose unit attached to a hydroxyl group of one of the mannose units. On the average, each of the anhydro sugar units contains three available hydroxyl sites. A degree of substitution of three would mean that all of the available hydroxy sites have been substituted with ether groups.

POLYGALACTOMANNAN GUM COMPONENT

Preferred types of polygalactomannan gums for application as a component of the invention thickener composition include guar gum and locust bean gum. Another preferred type of polygalactomannan gum is the hydroxyalkyl ether derivatives which have a degree of substitution between about 0.1 and 3, and which have an alkyl group containing between 1 and about 6 carbon atoms.

Etherification of polygalactomannan gums is generally accomplished with polygalactomannan gums in the form of finely divided powders or in the form of gum "splits".

Guar gum and other polygalactomannan hydrocolloids are derived from certain seeds of the plant family "leguminosae". The seeds are composed of a pair of tough, non-brittle endosperm sections referred to as "splits", between which is sandwiched a brittle embryo layer. The entire structure is enclosed in a tough seed coat.

The endosperm splits are extremely tough and non-brittle. This renders them difficult to reduce into a finely divided state. One method of separating the endosperm splits is described in U.S. Pat. No. 3,132,681. Methods of reducing endosperm splits into finely divided powder are described in U.S. Pat. No. 2,891,050; U.S. Pat. No. 3,455,899; and references cited therein.

Hydroxyalkyl ethers of polygalactomannan gums are readily prepared by the reaction of a polygalactomannan gum with an alkylene oxide containing between 1 and about 6 carbon atoms, e.g., ethylene oxide, propylene oxide, butylene oxide, hexylene oxide and the like.

The reaction of a polygalactomannan gum and an alkylene oxide is conveniently conducted at a temperature between about 20° C. and 100° C. and a pressure between about 15 and 150 psi, in a solvent medium in the presence of an alkaline catalyst such as sodium hydroxide or calcium hydroxide. Suitable solvent media include water, cyclic and acyclic alkyl ethers, alkanones, hydrocarbons, dialkylformamide, and the like, and mixtures thereof. Illustrative of useful organic solvents are pentane, acetone, methylethylketone, diethylketone, tetrahydrofuran, dioxane and dimethylformamide.

COPOLYMER COMPONENT

The preferred types of copolymers for application as a component of the invention thickener composition are those which are composed of an $\alpha,\beta$-olefinically unsaturated dicarboxylic acid anhydride and a comonomer selected from $\alpha$-olefinically unsaturated hydrocarbons and alkyl vinyl ethers.

Illustrative of $\alpha,\beta$-olefinically unsaturated dicarboxylic acid anhydride comonomers are those represented by the formula:

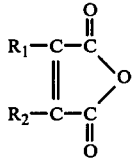

wherein $R_1$ and $R_2$ are independently selected from the group consisting of hydrogen, halogen, cyano, alkyl, aryl, alkaryl, aralkyl, cycloaliphatic, and the like.

Compounds corresponding to the above formula include maleic anhydride, chloromaleic anhydride, 2,3-dichloromaleic anhydride, cyanomaleic anhydride, 2,3-dicyanomaleic anhydride, methylmaleic anhydride, 2,3-dimethylmaleic anhydride, ethylmaleic anhydride, propylmaleic anhydride, butylmaleic anhydride, 2,3-di-n-butylmaleic anhydride, phenylmaleic anhydride, cyclohexylmaleic anhydride, 2,3-diphenylmaleic anhydride dodecylmaleic anhydride, naphthylmaleic anhydride, o-chlorophenylmaleic anhydride, and the like.

Illustrative of $\alpha$-olefinically unsaturated hydrocarbon comonomers are those which contain between 2 and about 6 carbon atoms, such as ethylene, propylene, butylene, isobutylene, pentylene and hexylene.

Illustrative of alkyl vinyl ether comonomers are those in which the alkyl substituent contains between 1 and about 10 carbon atoms, such as methyl vinyl ether, butyl vinyl ether, octyl vinyl ether and decyl vinyl ether.

The ratio of the comonomers in the copolymer component usually is in a 1:1 ratio, and in some cases the ratio will vary between 5:4 and 4:5. The molecular weight of the copolymer may vary over a wide range between several hundred and several million. In terms of viscosity as disclosed in U.S. Pat. No. 3,781,203, the specific viscosity values can vary between about 0.1 and 10.

Illustrative of a suitable copolymer is Gantrez AN(-GAF), which corresponds to the structural formula:

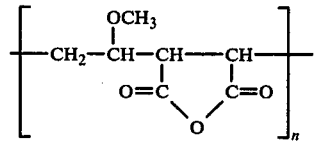

where n is an integer between about 11 and 700.

PREPARATION OF COMPOSITIONS

The dry blend thickener composition of the present invention is prepared by simple physical admixture of the polygalactomannan gum and copolymer components. The degree of blending and homogeneity of the thickener composition in the dry state is not critical, since complete homogeneity is achieved when the thickener is hydrated in an aqueous medium with stirring.

The polygalactomannan gum and copolymer components are employed in the thickener composition in a ratio between about 0.05 and 15 parts by weight of polygalactomannan gum per part by weight of copolymer.

The aqueous composition of the present invention is prepared by adding the thickener composition to an aqueous medium in a quantity between about 0.2 and 5 weight percent, based on the total aqueous composition weight. On the average the preferred quantity of added thickener composition will be in the range between about 0.3 and 2 weight percent, based on the total aqueous composition weight.

In order to achieve solubilization of the copolymer component of the thickener composition in an aqueous medium, it is advantageous to add alkali metal hydroxide to the aqueous medium to convert the carboxylic acid anhydride groups of the copolymer into the form of neutral salts. Hence, it is desirable that the ultimate pH of the thickened aqueous composition be in the range between about 4 and 13, and preferably in the range between about 7 and 11. The adjustment of pH, and the hydration of the copolymer component, are facilitated by the addition of an appropriate quantity of sodium hydroxide.

If desired, the thickened aqueous composition can be prepared by first dissolving the respective polygalactomannan gum and copolymer thickener components to form individually separate aqueous solutions, and then blending the two solutions together.

UTILITY

The present invention dry blend thickener composition imparts advantageous properties to an aqueous medium when incorporated in the manner described above. The resultant thickened aqueous composition exhibits excellent solution stability under a variety of adverse conditions.

The present invention thickener composition has the unique ability to impart high viscosity to an aqueous medium at a relatively low concentration. This is due to a synergistic viscosity effect derived from the interaction of the polygalactomannan gum and copolymer components of the thickener composition, i.e., as demonstrated in Example II.

The present invention thickener composition is superior to conventional hydrocolloid gums for application in petroleum, textile, printing, paper and pharmaceutical industries.

A particularly important application of the present invention thickener composition is as a gelling agent in a hydraulic well-treating fluid medium, e.g., a hydraulic fracturing fluid composition.

A hydraulic fracturing fluid composition functions to force fracturing under hydrostatic pressure, and it serves to transport the suspension of propping agent into the porous subterranean formations. The hydraulic well-treating fluid medium must exhibit advantageous viscosity and particulate solids transport properties.

Hydraulic fracturing fluids commonly employ a viscosity increasing agent such as a water-soluble polymer to improve the flow characteristics and the suspending ability of the fluids. Carboxymethylcellulose, polyacrylamide, polyvinylpyrrolidone, guar, tragacanth, Irish moss, modified starch, and the like, have been employed as water-soluble or water-dispersible additives to provide pumpable gels having solids suspending properties. U.S. Pat. Nos. 3,483,121; 3,757,864; 3,779,914; 3,818,998; 3,900,069; 3,971,440; and references cited therein, describe hydraulic well-treating compositions which contain novel polymeric friction-reducing gelling components.

Hydraulic fracturing fluids which contain a natural gum, such as unmodified polygalactomannan gum, commonly include a breaker additive to effect a delayed action thinning out of the fluid medium. This facilitates the subsequent removal of the hydraulic fracturing fluid composition from the fractured formation.

Breaker additives include enzymes which under the well-fracturing conditions in a delayed manner autonomously reduce the hydraulic fluid viscosity by degrading the natural gum incorporated as a gelling agent. U.S. Pat. Nos. 2,681,704; 2,801,218; 3,615,794; 3,684,710; and references cited therein, describe new enzyme compositions, such as mannan depolymerase which is derived from a microbiologic source.

The disadvantage of employing natural gum as a gelling agent in hydraulic fracturing fluids is the lessening of fluid loss control caused by plugging of apertures which reduces the permeability of a fractured formation. In the case where a natural resin such as guar gum is employed as a gelling agent in combination with an enzyme breaker additive in a hydraulic fracturing fluid, the hydraulic system is unsatisfactory because the hydrolysis residue of the natural gum is present in sufficient quantity to create a plugging effect and reduces the permeability of a fractured formation.

Hence, a further embodiment of the present invention is the provision of a well-fracturing fluid composition having improved viscosity and suspending properties, which composition comprises an aqueous solution containing (1) a gelling agent consisting essentially of a polygalactomannan gum and a copolymer of an $\alpha,\beta$-olefinically unsaturated dicarboxylic acid anhydride and a comonomer selected from $\alpha$-olefinically unsaturated hydrocarbons and alkyl vinyl ethers, and (2) a breaker additive for reduction of solution viscosity.

More particularly, a preferred well-fracturing fluid composition of the present invention comprises (1) an aqueous medium; (2) a gelling agent consisting essentially of a polygalactomannan gum and a copolymer of an $\alpha,\beta$-olefinically unsaturated dicarboxylic acid anhydride and a comonomer selected from $\alpha$-olefinically unsaturated hydrocarbons and alkyl vinyl ethers; (3) a breaker additive for subsequent autonomous reduction of the gelling properties of the gelling agent; and (4) a propping agent. Illustrative of propping agents are sand and walnut shells.

The breaker additive is preferably an enzyme which under formation fracturing conditions autonomously degrades the polygalactomannan gum component so as to reduce the viscosity of hydraulic fluid which is under hydrostatic pressure. Although the effect of the enzyme breaker additive commences immediately upon intimate admixture of the gelling agent and the breaker additive, the time required to reduce the solution viscosity by 50 percent can range over a period between about one half hour and two hours. The rate of polybalactomannan gum degradation is affected by pH, temperature, and salt content of the hydraulic fluid system.

The enzyme breaker additive can be employed in a quantity between about 0.01 and 5 weight percent, based on the weight of polygalactomannan gum in a hydraulic fluid composition. Hemicellulase enzyme is illustrative of a suitable breaker additive for the present invention, hydraulic fluid compositions.

Another type of breaker additive compounds which can be employed are oxidizing agents. Illustrative of suitable breaker additives of this type are ammonium persulfate, potassium dichromate, potassium permanganate, peracetic acid, tertiarybutyl hydroperoxide, and the like. This class of breaker additive can be employed in a quantity between about 0.5 and 20 weight percent, based on the weight of polygalactomannan gum in a hydraulic fluid composition.

The above-described classes of breaker additive compounds are known in the art. The selection and application of breaker additives in hydraulic well-treating fluid compositions is described in U.S. Pat. Nos. 3,922,173; 3,960,736; 4,021,355; and references cited therein; and in *Hydraulic Fracturing*, by G. C. Howard and C. R. Fast, Monograph Series, Volume 2, Society of Petroleum Engineers, Dallas, Texas (1970).

The following examples are further illustrative of the present invention. The reactants and other specific ingredients are presented as being typical, and various modifications can be derived in view of the foregoing disclosure within the scope of the invention.

EXAMPLE I

Purification Of Guar Gum

Guar gum is extracted with methanol to remove methanol-soluble oils. The guar gum so treated is wetted with isopropanol, then sufficient water is added slowly to form a 0.05% solution. After standing overnight, the solution is centrifuged at 8000 rpm for 30 minutes. The clear supernatant is decanted from the insoluble residue and filtered through glass fiber filter paper.

The filtrate solution is diluted with ethanol to precipitate the guar gum. The precipitate is filtered, dried, and ground in a Wiley mill through a 40 mesh screen.

The purified guar gum powder has less than 0.1% nitrogen content, and about 0.48% ash content. For the purposes of the present invention, either purified or unpurified guar gum or other polygalactomannan gum can be employed to produce the dry blend compositions and aqueous compositions of the present invention.

EXAMPLE II

This Example illustrates the preparation of dry blend and aqueous compositions of the present invention.

A.

A dry blend composition is prepared by the simple expediency of admixing the respective composition components. It is not required that the admixture be blended until homogeneous, since the dry blend composition components dissolve individually when the composition is added to an aqueous medium as a thickening agent.

A typical dry blend composition is prepared by admixing 10 grams of purified guar gum with 10 grams of Isobam HH[1] or Gantrez AN-179[2].

[1] Kuraray Co. Ltd., Osaka, Japan. Copolymer of maleic anhydride and isobutylene.
[2] GAF, New York, New York. Copolymer of maleic anhydride and methyl vinyl ether.

B.

An aqueous composition is prepared by adding a dry blend composition as described above to an aqueous medium as a thickening agent. Dissolution of the copolymer component (e.g., Isobam HH or Gantrez AN-179) is aided by adjusting the pH of the aqueous medium into the range of 7-11 with sodium hydroxide.

As an alternative method of preparation of the aqueous compositions, the polygalactomannan gum and the copolymer components are first dissolved individually in water to form separate aqueous solutions. Then an aliquot of each solution is combined to produce one of the desired high viscosity aqueous compositions of the present invention. The following procedure and data are illustrative of this alternative preparative method.

Guar gum and hydroxypropyl ether of guar gum are individually dissolved in water to form separate 1% by weight solutions. Isobam HH is dissolved in water in the form of the sodium salt to produce a 1% by weight solution. Gantrez AN-179 is dissolved in water in the form of the sodium salt to produce a 3% by weight solution. All of the solutions are allowed to stand overnight.

Various aliquots of the polygalactomannan gum solutions and the copolymer solutions are blended, and the viscosities of the resulting solutions are measured after one hour using a Brookfield RVF Viscometer, Spindle #4 at 20 rpm. The viscosity data are summarized in the following TABLE.

TABLE

| 1. Percent by weight, components in blend: | | | | | | | | | | | |
|---|---|---|---|---|---|---|---|---|---|---|---|
| Guar Gum | 100 | 90 | 80 | 70 | 60 | 50 | 40 | 30 | 20 | 10 | 0 |
| Isobam HH | 0 | 10 | 20 | 30 | 40 | 50 | 60 | 70 | 80 | 90 | 100 |
| 15 CPS | 4400 | 6200 | 6850 | 7200 | 7500 | 7650 | 7300 | 6800 | 6200 | 5400 | 5350 |
| 2. Percent by weight, components in blend: | | | | | | | | | | | |
| Hydroxypropyl Guar Gum | 100 | 90 | 80 | 70 | 60 | 50 | 40 | 30 | 20 | 10 | 0 |
| Isobam HH | 0 | 10 | 20 | 30 | 40 | 50 | 60 | 70 | 80 | 90 | 100 |
| 1% CPS | 4200 | 7000 | 7600 | 7800 | 7900 | 7750 | 7500 | 6850 | 6900 | 5850 | 5100 |
| 3. Percent by volume, components in blend: | | | | | | | | | | | |
| Guar Gum | 100 | 90 | 80 | 70 | 60 | 50 | 40 | 30 | 20 | 10 | 0 |
| Gantrez AN-179 | 0 | 10 | 20 | 30 | 40 | 50 | 60 | 70 | 80 | 90 | 100 |
| CPS | 4700 | 8650 | 9300 | 9000 | 7900 | 6850 | 5800 | 4500 | 3600 | 2500 | 1750 |

EXAMPLE III

Oil Well Fracturing, Insoluble Residue Test

Guar gum hydroxypropyl ether (D.S. of 0.3) is dissolved in 400 milliliters of water to form a 0.5% aqueous solution. A second 0.5% solution is prepared in the same manner by dissolved Isobam HH sodium salt in 400 milliliters of water. The two solutions are then blended together. To the resultant solution is added 0.01% by weight of hemicellulose enzyme, and the solution is aged overnight at 30° C., and then centrifuged. Supernatant liquid is decanted, and insoluble residue is recovered. The residue is slurried with water, then the residue is separated from the liquid, dried and weighed.

The weight of the insoluble residue from the gelled solution after enzyme treatment is 1.5%, based on the original weight of guar gum hydroxypropyl ether and Isobam HH.

The Insoluble Residue Test can be conducted in the same manner employing an acid, ester or oxidizing compound as the breaker additive, e.g., sulfuric acid, potassium permanganate or methyl formate.

These results demonstrate that a present invention composition is adapted for application as a gelling agent in hydraulic well-fracturing fluid compositions.

What is claimed is:

1. A dry blend composition adapted for application as a thickening agent in aqueous solutions which comprises (1) a polygalactomannan gum and (2) a copolymer of an $\alpha,\beta$-olefinically unsaturated dicarboxylic acid anhydride and a comonomer selected from $\alpha$-olefinically unsaturated hydrocarbons and alkyl vinyl ethers.

2. A composition in accordance with claim 1 wherein the polygalactomannan gum and the copolymer are present in a ratio between about 0.05 and 10 parts by weight of polygalactomannan gum per part by weight of copolymer.

3. A composition in accordance with claim 1 wherein the polygalactomannan gum is guar gum.

4. A composition in accordance with claim 1 wherein the polygalactomannan gum is locust bean gum.

5. A composition in accordance with claim 1 wherein the polygalactomannan gum is a hydroxyalkyl ether derivative having a degree of substitution between about 0.1 and 3.

6. A composition in accordance with claim 1 wherein the α,β-olefinically unsaturated dicarboxylic acid anhydride in the copolymer is maleic anhydride.

7. A composition in accordance with claim 1 wherein the copolymer is composed of maleic anhydride and isobutylene comonomers.

8. A composition in accordance with claim 1 wherein the copolymer is composed of maleic anhydride and methyl vinyl ether comonomers.

9. An aqueous composition having a pH in the range between about 4 and 13, and containing as a thickening agent a combination of (1) a polygalactomannan gum and (2) a copolymer of an α,β-olefinically unsaturated dicarboxylic acid anhydride and a comonomer selected from α-olefinically unsaturated hydrocarbons and alkyl vinyl ethers.

10. An aqueous composition in accordance with claim 9 having a pH between about 7 and 11.

11. An aqueous composition in accordance with claim 9 wherein the polygalactomannan gum and the copolymer are present in a ratio between about 0.05 and 10 parts by weight of polygalactomannan gum per part by weight of copolymer.

12. An aqueous composition in accordance with claim 9 wherein the thickening agent is present in a quantity between about 0.2 and 5 weight percent, based on the total composition weight.

13. An aqueous composition in accordance with claim 9 wherein the polygalactomannan gum is guar gum.

14. An aqueous composition in accordance with claim 9 wherein the polygalactomannan gum is locust bean gum.

15. An aqueous composition in accordance with claim 9 wherein the polygalactomannan gum is a hydroxyalkyl ether derivative having a degree of substitution between about 0.1 and 3.

16. An aqueous composition in accordance with claim 9 wherein the α,β-olefinically unsaturated dicarboxylic acid anhydride in the copolymer is maleic anhydride.

17. An aqueous composition in accordance with claim 9 wherein the copolymer is composed of maleic anhydride and isobutylene comonomers.

18. An aqueous composition in accordance with claim 9 wherein the copolymer is composed of maleic anhydride and methyl vinyl ether comonomers.

19. An aqueous composition in accordance with claim 9 wherein the thickening agent contributes a greater viscosity increase than the additive viscosity effects of the respective polygalactomannan gum and copolymer components of the said thickening agent.

20. A hydraulic well-treating fluid composition which comprises an aqueous solution containing (1) a gelling agent consisting essentially of a polygalactomannan gum and a copolymer of an α,β-olefinically unsaturated dicarboxylic acid anhydride and a comonomer selected from α-olefinically unsaturated hydrocarbons and alkyl vinyl ethers, and (2) a breaker additive for reduction of solution viscosity.

21. A fluid composition in accordance with claim 20 having a pH between about 4 and 13.

22. A fluid composition in accordance with claim 20 wherein the gelling agent is present in a quantity between about 0.2 and 5 weight percent, based on the weight of water.

23. A fluid composition in accordance with claim 20 wherein the polygalactomannan gum is guar gum.

24. A fluid composition in accordance with claim 20 wherein the methyl ether of polygalactomannan gum is locust bean gum.

25. A fluid composition in accordance with claim 20 wherein the polygalactomannan gum is a hydroxylalkyl ether derivative having a degree of substitution between about 0.1 and 3.

26. A fluid composition in accordance with claim 20 wherein the α,β-olefinically unsaturated dicarboxylic acid anhydride in the copolymer is maleic anhydride.

27. A fluid composition in accordance with claim 20 wherein the copolymer is composed of maleic anhydride and isobutylene comonomers.

28. A fluid composition in accordance with claim 20 wherein the copolymer is composed of maleic anhydride and methyl vinyl ether comonomers.

29. A hydraulic well-fracturing fluid composition comprising (1) an aqueous medium; (2) a gelling agent consisting essentially of a polygalactomannan gum and a copolymer of an α,β-olefinically unsaturated dicarboxylic acid anhydride and a comonomer selected from α-olefinically unsaturated hydrocarbons and alkyl vinyl ethers; (3) a breaker additive for subsequent autonomous reduction of the gelling properties of the gelling agent; and (4) a propping agent.

30. A hydraulic well-fracturing fluid composition in accordance with claim 29 wherein the breaker additive is an enzyme.

31. A hydraulic well-fracturing fluid composition in accordance with claim 29 wherein the breaker additive is an oxidizing compound.

32. A hydraulic well-fracturing fluid composition in accordance with claim 29 wherein the propping agent is sand.

* * * * *